(12) United States Patent
Yang et al.

(10) Patent No.: US 10,152,539 B2
(45) Date of Patent: Dec. 11, 2018

(54) WEBPAGE SEARCHING METHOD AND BROWSER

(71) Applicant: BEIJING QIHOO TECHNOLOGY COMPANY LIMITED, Beijing (CN)

(72) Inventors: Lianqiang Yang, Beijing (CN); Zhihua Ma, Beijing (CN); Enping Gan, Beijing (CN); Huan Ren, Beijing (CN)

(73) Assignee: Beijing Qihoo Technology Company Limited, Beijing (CN)

( * ) Notice: Subject to any disclaimer, the term of this patent is extended or adjusted under 35 U.S.C. 154(b) by 358 days.

(21) Appl. No.: 14/652,846

(22) PCT Filed: Sep. 17, 2013

(86) PCT No.: PCT/CN2013/083618
§ 371 (c)(1),
(2) Date: Jun. 17, 2015

(87) PCT Pub. No.: WO2014/094467
PCT Pub. Date: Jun. 26, 2014

(65) Prior Publication Data
US 2015/0339386 A1    Nov. 26, 2015

(30) Foreign Application Priority Data
Dec. 17, 2012 (CN) .......................... 2012 1 0548859

(51) Int. Cl.
*G06F 3/048* (2013.01)
*G06F 17/30* (2006.01)
*H04L 29/08* (2006.01)

(52) U.S. Cl.
CPC ........ *G06F 17/30864* (2013.01); *H04L 67/02* (2013.01)

(58) Field of Classification Search
CPC . G06F 17/30864; G06F 3/0481; G06F 9/4443
See application file for complete search history.

(56) References Cited

U.S. PATENT DOCUMENTS 9,043,314 B2 * 5/2015 Chen ................. G06F 17/30867
707/722
2006/0277167 A1 * 12/2006 Gross ................ G06F 17/30905
(Continued)

OTHER PUBLICATIONS

Jin, S. H. et al., English abstract only of Chinese application No. CN101636735A, Apparatus and method for integration search of web site, publication date Jan. 27, 2010, one page.
(Continued)

*Primary Examiner* — Mahelet Shiberou
(74) *Attorney, Agent, or Firm* — Polsinelli PC (57) ABSTRACT

The present disclosure provides a webpage searching method and a browser, wherein the method comprises: loading search category list information and search engine list information to a first sub-window of a browser webpage window; according to a search category selected from the search category list information and a search key word input at the browser side, initiating a search request to a search engine selected from the search engine list information according to the search category; and loading to a second sub-window of the browser webpage window a corresponding search result returned from the selected search engine on the basis of a search request. The present invention provides a sub-window for loading a search category list and a search engine list in a browser webpage window, a user can select in the current browser window a search category and a search engine to conduct a new search, thus significantly improving search efficiency, facilitating the user in checking and comparing a plurality of search results, and improving user experience.

16 Claims, 6 Drawing Sheets

(56) References Cited

U.S. PATENT DOCUMENTS

| | | | | |
|---|---|---|---|---|
| 2007/0112759 A1* | 5/2007 | Kulakow | .......... | G06F 17/30646 |
| 2007/0112949 A1* | 5/2007 | Lunenfeld | ......... | G06F 17/30864 |
| | | | | 709/223 |
| 2007/0185843 A1* | 8/2007 | Jones | ................ | G06F 17/30864 |
| 2008/0201304 A1* | 8/2008 | Sue | .................. | G06F 17/30696 |
| 2012/0054166 A1* | 3/2012 | Jeremias | ........... | G06F 17/30265 |
| | | | | 707/706 |
| 2012/0059813 A1* | 3/2012 | Sejnoha | ............ | G06F 17/30864 |
| | | | | 707/707 |
| 2012/0060113 A1* | 3/2012 | Sejnoha | ................ | G06F 3/0482 |
| | | | | 715/783 |
| 2012/0158702 A1 | 6/2012 | Kumar et al. | | |
| 2012/0203757 A1* | 8/2012 | Ravindran | ........ | G06F 17/30864 |
| | | | | 707/706 |
| 2013/0179762 A1* | 7/2013 | Gray | ................ | G06F 17/30864 |
| | | | | 715/205 |

OTHER PUBLICATIONS

Liang, S. et al., English abstract only of Chinese application No. CN102456054A, Searching method and system, publication date May 16, 2012, one page.

International Search Report regarding PCT/CN2013/083618, dated Dec. 19, 2013, 2 pages.

\* cited by examiner

WEBPAGE SEARCHING METHOD AND BROWSER

FIELD OF THE INVENTION

The present invention relates to the technical field of Internet, and particularly to a webpage searching method and a browser.

BACKGROUND OF THE INVENTION

As the Internet develops rapidly, the amount of information provided on the Internet gets increasingly greater. It is the most common behavior for an Internet user to use a webpage browser to search for information via a search engine to obtain desired information from the Internet.

A search engine refers to a system of using a specific computer program to search for information from the Internet according to a certain search strategy, organizing and processing the information, then providing search service for the user and displaying the related information to the user. Baidu, Google, 360 and the like are typical search engines. To improve the accuracy of search results, a search engine usually further provides different search categories such as webpage, video, picture, music and etc. for the user to select. The search engine can perform a corresponding search operation according to the search category selected by the user.

As search strategies and information organizing and processing manners of different search engines are different, different search engines might provide different search results even though the user uses the same search key word to search. Hence, to thoroughly understand the search result or learn about different search results of different search engines, the user often needs to perform search in different search engines using the same search key word.

SUMMARY OF THE INVENTION

In view of the above problems, the present invention is proposed to provide a webpage searching method, a browser and a corresponding program which are capable of overcoming the above problems or at least partially solving or easing the above problems.

According to an aspect of the present invention, there is provided a browser for performing webpage search, comprising a window generator configured to generate a first sub-window and a second sub-window in a browser webpage window of the browser; a first sub-window loader configured to load content in the first sub-window of the browser webpage window, wherein the loaded content of the first sub-window includes search category list information and search engine list information corresponding to search categories in the search category list information, to enable a user to select a search category and a search engine; a search request generator configured to initiate a search request to the search engine selected from the search engine list information corresponding to the search category according to the search category selected from the search category list information and a search key word input at the browser side; and a search result loader configured to load in the second sub-window of the browser webpage window a search result returned by the search engine selected from the search engine list information according to the search request.

Correspondingly, the present invention further provides a webpage searching method, comprising: loading in the first sub-window of the browser webpage window search category list information and search engine list information corresponding to search categories in the search category list information; according to the search category selected from the search category list information and a search key word input at the browser side, initiating a search request to the search engine in the search engine list information corresponding to the search category; and loading in the second sub-window of the browser webpage window a corresponding search result returned by the search engine selected from the search engine list information according to the search request.

According to another aspect of the present invention, there is provided a computer program which comprises a computer readable code, wherein when the computer readable code is executed on a user terminal, the user terminal executes the webpage searching method according to the claims.

According to yet another further aspect of the present invention, there is provided a computer readable medium which stores the computer program.

Advantageous effects of the present invention are as follows: according to the browser and the webpage searching method of the present invention, since the first sub-window for loading the search category list information and the search engine list information is provided in the browser webpage window, the user can select in the current browser window a desired search category and search engine to conduct a new search, and the search result is displayed in the second sub-window of the current browser webpage window. This can substantially improve search efficiency, facilitate the user in checking and comparing different search results, and improve user experience.

The above description only generalizes technical solutions of the present invention. The present invention may be implemented according to the content of the description in order to make technical means of the present invention more apparent. Specific embodiments of the present invention are exemplified to make the above and other objects, features and advantages of the present invention more apparent.

BRIEF DESCRIPTION OF THE DRAWINGS

Various other advantages and merits will become apparent to those having ordinary skill in the art by reading through the following detailed description of preferred embodiments. Figures are only intended to illustrate preferred embodiments and not construed as limiting the present invention. In all figures, the same reference numbers denote the same part. In the figures.

DETAILED DESCRIPTION OF THE INVENTION

Exemplary embodiments of the present disclosure will be described in more detail with reference to the figures. Although the figures show the exemplary embodiments of the present disclosure, it should be appreciated that the present disclosure may be implemented in various forms and should be not limited by the embodiment described here. On the contrary, these embodiments are provided to make the present disclosure more apparent and entirely convey the scope of the present disclosure to those skilled in the art.

To facilitate the user's operation, the browser may provide in a search interface a plurality of search engines and a plurality of search categories for the user to select, and may initiate a corresponding search request according to the user's selection. Such search interface may be set at a starting webpage of the browser, a new tab or a search bar of a navigation webpage, or set at a search column of the browser, and the search result is loaded in a new window of the browser or a window of the new tab after each search. As such, after a search, if the user desires to change to a different search engine, he needs to return to the starting webpage, new tab, navigation webpage or search column to select a search engine and/or a search category again. This is obviously inefficient and troublesome. Furthermore, regarding multiple times of searches with different search engines and/or search categories according to the user's selection, the user further needs to switch between different browser windows or tabs to look up or compare results of multiple times of searches. This is also inefficient and inconvenient.

Figure 1:
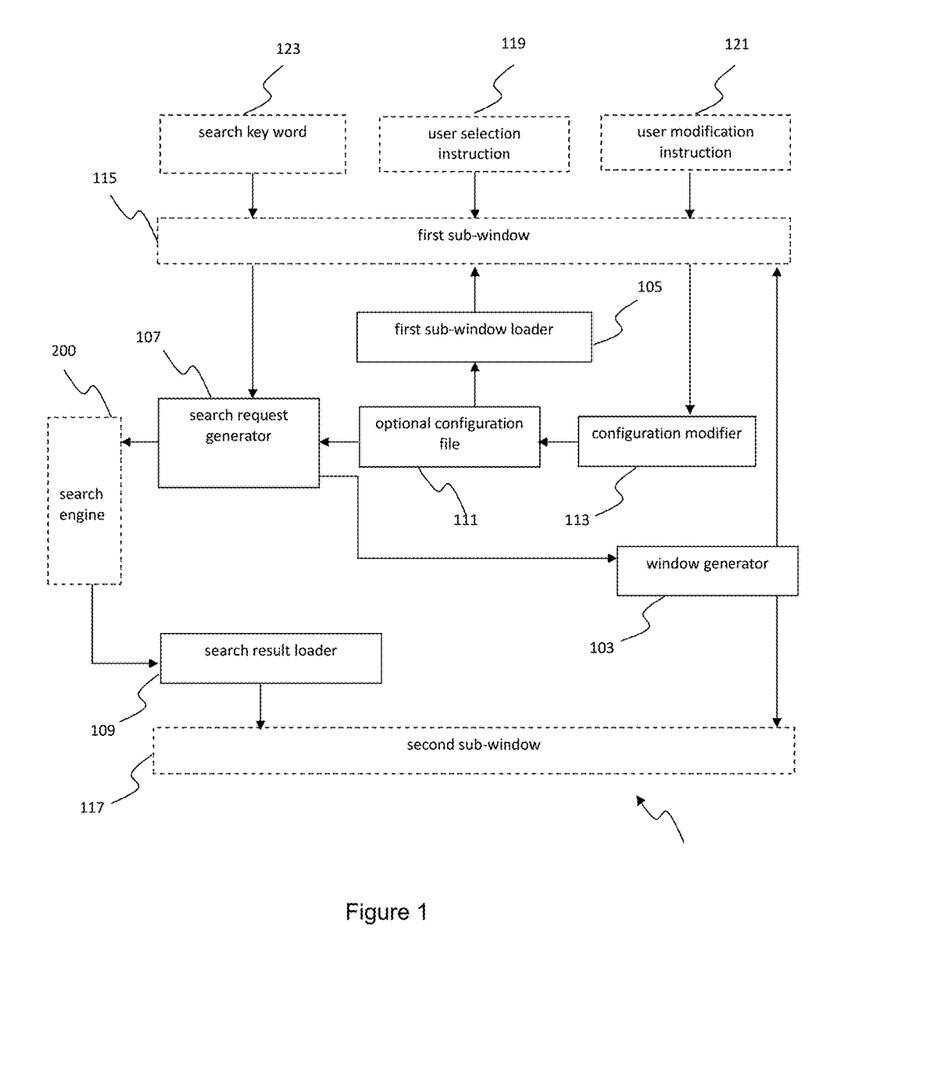
FIG. 1 illustrates a schematic structural diagram of an embodiment of a browser according to the present invention.

FIG. 1 illustrates an embodiment of a browser according to the present invention. The browser 100 may comprise a window generator 103, a first sub-window loader 105, a search request generator 107 and a search result loader 109, and optional configuration file 111 and configuration modifier 113.

Referring to FIG. 1, the window generator 103 is used to generate a first sub-window 115 and a second sub-window 117 in a browser webpage window of the browser 100. The first sub-window loader 105 is used to load content in the first sub-window 115, wherein the loaded content at least includes search category list information and search engine list information. Optionally, the first sub-window loader 105 can further load in the first sub-window 105 an input box control for inputting a search key word. The search result loader 109 is used to load in the second sub-window 117 a search result of a search request initiated by the user.

In an embodiment, the window generator 103 may divide the first sub-window 115 from a side portion of the browser webpage window. The first sub-window 115 for example may be located in an upper portion, a lower portion, a left side or a right side of the browser webpage window. A portion of the browser webpage window other than the first sub-window 115 may be the second sub-window 117.

Figure 2A:
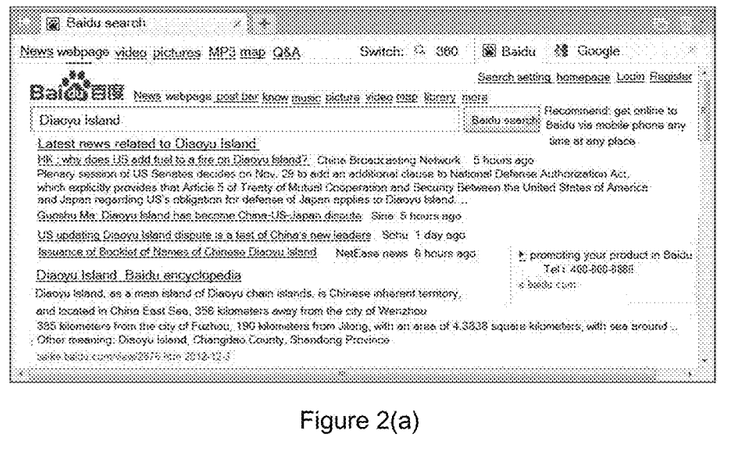
FIG. 2(a) illustrates an exemplary layout of a webpage window of the browser according to the present invention.
Figure 2B:
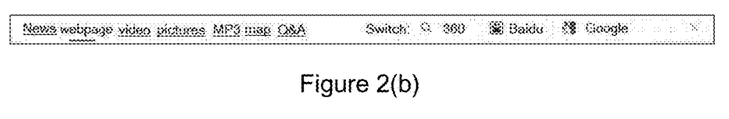
FIG. 2(b) illustrates a first sub-window portion of the webpage window of the browser of FIG. 2(a)
Figure 2C:
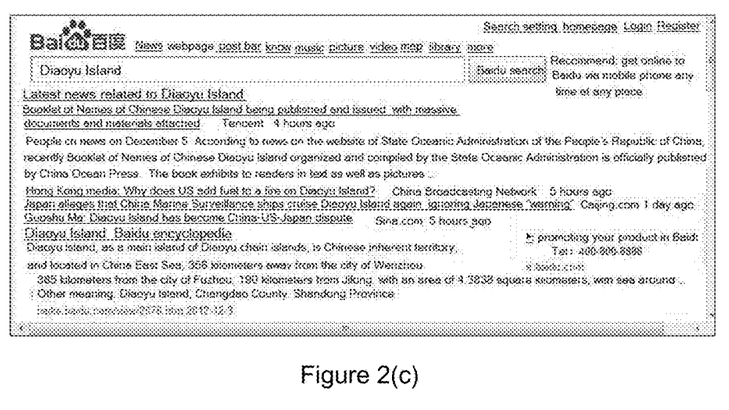
FIG. 2(c) illustrates a second sub-window portion of the webpage window of the browser of FIG. 2(a)

FIG. 2(a) illustrates an exemplary layout of a browser webpage window of the browser 100. The first sub-window 115 is divided from an upper portion of the browser webpage window, and as shown in FIG. 2(b), it loads a search category list including "news", "webpage", "video" and so on, and further loads a search engine list including "360 webpage", "Baidu webpage" and "Google webpage" corresponding to the currently-selected "webpage" category. The portion of the browser webpage window other than the first sub-window 115 is the second sub-window 117, which currently loads an exemplary search result as shown in FIG. 2(c).

The window generator 103 may be triggered to execute in many manners to generate the first sub-window 115 and the second sub-window 117. In an embodiment, the window generator 103 cab be triggered to execute by an external search request. The external search request refers to a search request initiated from outside the browser webpage window including the first sub-window 115 and the second sub-window 117. For example, the external search request may be initiated from a starting webpage of the browser, a new tab, a search bar in a navigation webpage or a search column of the browser. For example, in the search bar provided in the navigation webpage of the browser for search purpose, the user may select a search category such as "webpage", "video", "picture" or etc., select a search engine such as Baidu or Google, and initiate a search request according to the search key word input by the user in the input box control of the search bar. Once the external search request is initiated, the window generator 103 may generate the first sub-window 115 and the second sub-window 117 in the browser webpage window, the first sub-window loader 105 loads in the first sub-window 115 search category list information and search engine list information, and the search result loader 109 records in the second sub-window 117 a search result corresponding to the search request. The browser webpage window including the first sub-window 115 and the second sub-window 117 may be a current webpage window upon initiating the external search request, or a newly-built browser webpage window, or a webpage window of a newly-built tab. In other embodiments, the window generator 103 may also be triggered to execute in other manners, for example, may be triggered to execute in response to an operation of a browser webpage window or a newly-built tab newly built by the user so as to generate the first sub-window 115 and the second sub-window 117 in the browser webpage window or the webpage window of the tab newly built by the user. It can be appreciated that, under such circumstances, the first sub-window loader 115 may load in the first sub-window 115 the search category list information and search engine list information, whereas the second sub-window 117 may remain blank as there is no search request currently.

After the first sub-window loader 105 loads in the first sub-window 115 the search category list information and search engine list information, as shown in FIG. 1 the user can send a user selection instruction 119 by a selection operation through the first sub-window 115, and select a desired search category and a search engine from the search category list information and search engine list information to initiate a corresponding search request.

The search request generator 107 is used to, according to the search key word and the search category selected by the user from the search category list information in the first sub-window 115, initiate a search request to the search engine 200 selected by the user from the search engine list information in the first sub-window 115. Noticeably, the search engine 200 shown in FIG. 1 is not intended to refer to the same search engine, but to represent all possible various search engines, and to refer to a certain specific search engine selected by the user according to the user's selection. Different from the external search request described above, the search request initiated by the search request generator 107 can be initiated by the first sub-window 115 of the browser webpage window.

After the search request generator 107 initiates the search request, the search result loader 109 can load a corresponding search result returned from the search engine 200 to the second sub-window 117 generated by the window generator 103.

Figure 3:
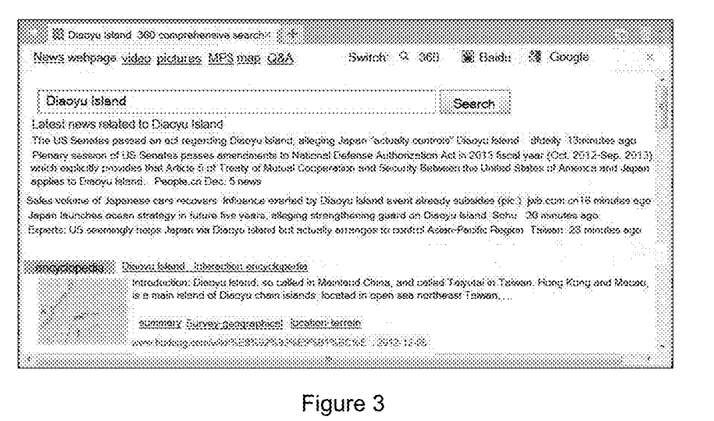
FIG. 3-FIG. 5 respectively illustrate more exemplary layouts of the webpage window of the browser according to the present invention.

As can be easily seen, the search request corresponding to the current search result shown in FIG. 2 is initiated to the search engine "Baidu" based on the search key word "钓鱼岛" and the search category information "webpage". FIG. 3 shows an example of a browser webpage window after user initiates a search request with the same search key word "钓鱼岛" by keeping the search category "webpage" in the first sub-window 115 on the basis of the search behavior shown in FIG. 2(a), but selecting another search engine "360 webpage". The search request can be a get request of a http generated according to the search key word and a web address URL corresponding to the search category and search engine selected by the user. Then, the search result loader 109 loads a search result returned from the search engine "360 webpage" to the second sub-window 117 in FIG. 3. Certainly, the user can simultaneously alter the search category and the search engine in the first sub-window 115 of the browser webpage window, or only alter the search category. As such, without returning to the user interface for initiating the external search engine, the user can directly select different search categories and/or search engines in the current browser webpage window and directly browse the corresponding search result in the current browser webpage window, thereby significantly improving search efficiency and improving convenience of search and user experience.

In the example of the browser webpage window shown in the above FIG. 2 and FIG. 3, since an interface for inputting the search key word is not provided to the user in the first sub-window 115, the search key word used in the search request generated by the search request generator 107 may employ the same search key word as the external search request. This assists the user in performing search in search results that use the same search key word but different search categories and/or search engines, thus it is convenient for the user to get a full understanding of search results, or insights into difference of different search results of different search engines. Certainly, as shown in FIG. 2 and FIG. 3, the user can also input the search key word in a search bar provided by a corresponding search engine in the search result loaded in the second sub-window 117, and initiate a new search request based on the search key word. Then, the current search key word can be used in the search request initiated by the search request generator 107.

As different search engines might provide incompletely identical search categories, and search engines may employ incompletely identical web address URL for different search categories, it is better for the browser 100 to use a configuration file 111 to reflect mapping relationships between a plurality of search categories and a plurality of search engines in order to facilitate the maintenance of the search category list information and search engine list information loaded in the first sub-window 115. In an embodiment, the configuration file 111 may take a form of a mapping table shown in Table 1.

TABLE 1

| Search category | Search engine | URL |
|---|---|---|
| webpage | Baidu | www.baidu.com |
| webpage | Google | www.google.com.hk |
| webpage | Youdao | www.youdao.com |
| ... | ... | ... |
| News | Baidu | news.baidu.com |
| News | 360 search | new.so.360.cn |
| News | Google news | www.google.com.hk/search?tbm=news&q=Key |

Figure 4:
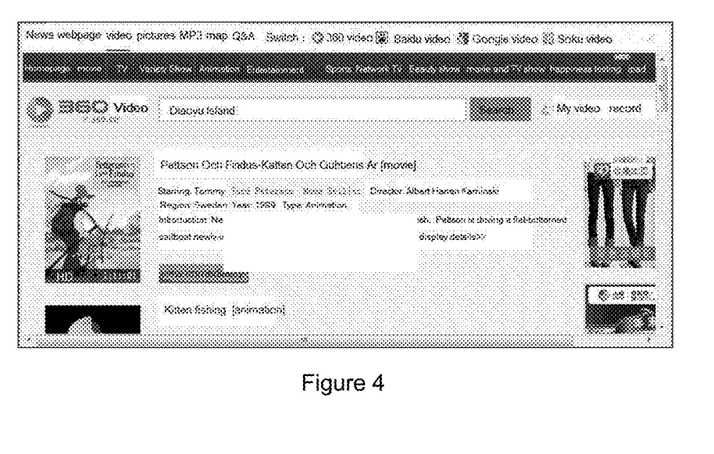

In this way, the first sub-window loader 105 can load in the first sub-window 115 the search category list and search engine list according to the configuration file 111. Upon loading, the first sub-window loader 105 can, according to the search category selected by the user from the search category list and according to the configuration file 111, dynamically load the search engine list corresponding to the selected search category; or the first sub-window loader 105 can, according to the search engine selected from the search engine list and according to the configuration file 111, dynamically load the search category list corresponding to the selected search engine. In the example of the browser webpage window shown in FIG. 4, when the user selects "video" in the search category, the first sub-window loader 105 can select all search engines with "video" category according to the configuration file 111 as shown in Table 1, for example, "360 video", "Baidu video", "Google video" and "Soku video", and load these search engines to the first sub-window 115 in a form of a list. It can be easily appreciated that in other embodiments, the user can select a search engine first, and then the first sub-window loader 105 dynamically loads various search categories provided by the search engine.

To maintain the configuration file 111, it can be updated when the browser 100 is updated, or a configuration modifier 113 can be used to receive a user modification instruction 121, and then the configuration file 111 can be modified and updated according to the user modification instruction 121. For example, the configuration file 111 may be updated to add or delete search engines, and/or add or delete search categories. In an embodiment, a portion or the whole configuration file 111 can be considered as browser user information and provided for operations such as backing up at a server side, loading to the server side or synchronizing to the server side. As such, when the user uses the browser 100 on different terminals, the information in the configuration file 111 can be maintained consistent on different terminals by backup, loading and/or synchronizing operation, so that the user can maintain essentially the same use experience on different terminals.

Figure 5:
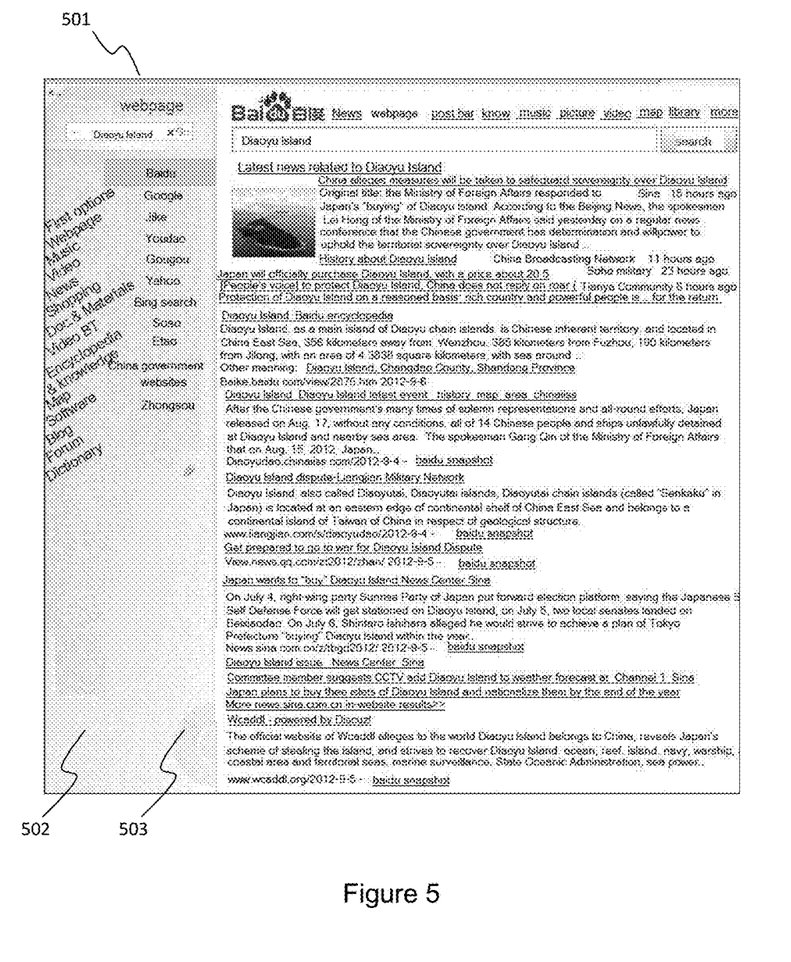

In an example of the browser webpage window shown in FIG. 5, the window generator 103 generates three first sub-windows 501-503 which are generally all located on the left side of the browser webpage window. In one first sub-window 501, the first sub-window loader 105 loads an input box control for the user to input a search key word such as "钓仙岛". In another first sub-window 502, the first first-window loader 105 loads the search category list. In a further first sub-window 503, the first sub-window loader 105 loads the search engine list. As stated above, the first sub-window loader 105 can also dynamically load the corresponding search engine list in the first sub-window 503 according to the search category selected from the first sub-window 502. In a further embodiment, any two or all of the three first sub-windows 501-503 can be implemented in a way of being combined into one first sub-window. In a further embodiment, these first sub-windows 501-503 can be arranged in other manners, for example, the first sub-window 502 can be formed as a horizontal elongate window located in the upper portion of the browser webpage window.

Referring to FIG. 1 and FIG. 5 simultaneously, since the input box control for the user to input the search key word is also loaded in the first sub-window 501, the user can input a search key word 123 to perform a search through the first sub-windows 501, 115 in the current browser webpage window. When the window generator 103 is triggered to execute in response to an operation of a browser webpage window or a newly-built tab newly built by the user, since the user has not yet input the search key word, it is very advantageous that the input box control is loaded in the first sub-window 501. As such, the search key word used in the search request generated by the search request generator 107 can be the search key word input in the input box control, certainly it also can be the search key word used by the user in last search, or the search key word selected by the user from a list of history record of search key words.

In an example as shown in FIG. 5, the search category list loaded in the first sub-window 502 further comprises a "preferred" option to indicate a preferred or default search category. As such, when a search request is initiated, if the user does not select a search category, the search request generator 107 will use the preferred search category information upon generating and initiating the search request. Similarly, although not shown, the search engine list loaded in the first sub-window 503 may also comprise a preferred search engine. Such preferred search engine information and/or preferred search category information can be set by the browser itself or the browser user himself, and stored in the configuration file 111.

Figure 6:
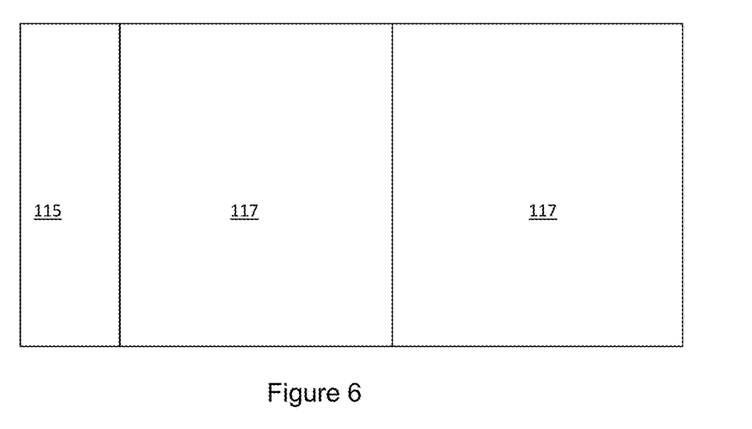
FIG. 6 is a schematic diagram of an exemplary layout of the webpage window of the browser according to the present invention.

In the schematic diagram of the browser webpage window shown in FIG. 6, the window generator 103 can generate two second sub-windows 117, and the search result loader 109 respectively loads in the two second sub-windows 107 search results corresponding to two search requests (which cab be the external search request and/or the search request initiated by the search request generator 107). The two search requests can be initiated according to the same search key word but according to different search categories and/or different search engines. Upon operation, after one search request is initiated (the search request can be the external search request or the search request initiated by the search request generator 107), the window generator 103 generates a first sub-window 115 and a second sub-window 117 as shown in FIG. 2-FIG. 5, and the search result corresponding to the search request is loaded in the second sub-window 117. Then, when the user selects a different search category and/or different search engine in the first sub-window 115 and the search request generator 107 generates a second search request, the window generator 103 can generate two second sub-windows 117 as shown in FIG. 6 for loading the search results corresponding to the two search requests respectively. Certainly, when the user initiates more search requests, the window generator 103 may generate more second sub-windows 117 correspondingly to load corresponding search results respectively. As such, by loading and displaying multiple search requests simultaneously in the same browser webpage window, the user can very conveniently loop up and compare different search results.

Figure 7:
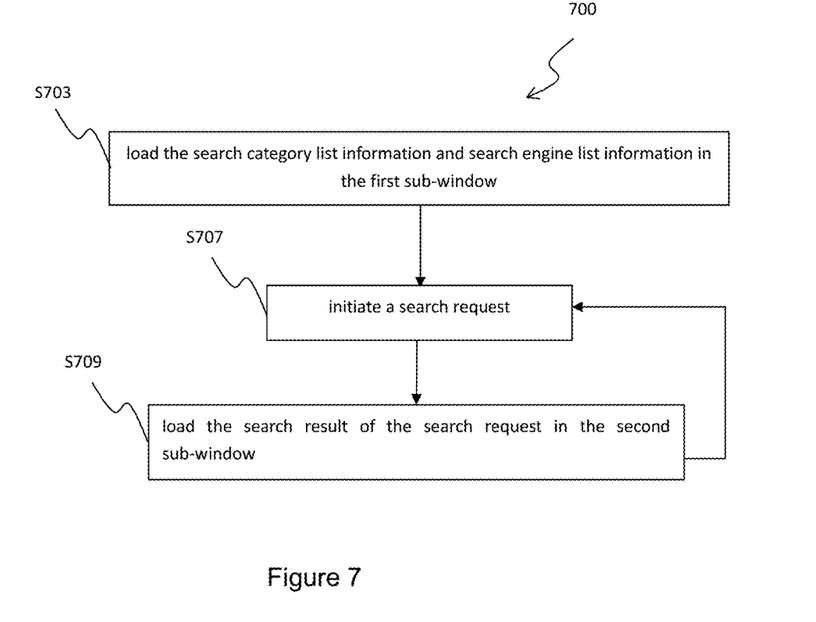
FIG. 7 illustrates a flowchart of an embodiment of a webpage searching method according to the present invention.

FIG. 7 illustrates a flowchart of an embodiment of a webpage searching method according to the present invention. The method 700 is adapted to be implemented in the above-mentioned browser 100.

The method 700 can begin with step S703 to load the search category list information and search engine list information corresponding to the search category in the search category list information in the first sub-window 115 of the browser webpage window as shown in FIG. 1. Optionally, in step S703, the input box control for inputting the search key word can be loaded in the first sub-window 115. As shown in FIG. 2-FIG. 5, the first sub-window 115 can be a window divided from the browser webpage window and located at a side portion of the browser webpage window such as an upper portion, lower portion, left side or right side. There may be plural first sub-windows 115, e.g., the example of FIG. 5 includes three first sub-windows 501-503, wherein the first sub-windows 502 and 503 are respectively used to load the search category list information and the search engine list information, and the first sub-window 501 is used to load the input box control.

As stated above, the configuration file 111 in the browser 100 shown in FIG. 1 can be provided to facilitate maintenance of the loaded search category list information and search engine list information. The configuration file 111 can reflect mapping relationships between a plurality of search categories and a plurality of search engines. As such, in step S703, the search category list information and search engine list information can be loaded according to the configuration file 111. In an embodiment, according to a search category selected from the search category list information and according to the configuration file, a search engine list corresponding to the selected search category is dynamically loaded; or according to a search engine selected from the search engine list information and according to the configuration file, a search category list corresponding to the selected search engine is dynamically loaded. The configuration file can also include preferred search engine information and/or preferred search category information set by the browser or browser user. As such, when the search request stated below is initiated, if the user does not select a search category and/or a search engine, the preferred search category information and/or preferred search engine information will be used. It is better that the configuration file can be updated by the browser or configured by the browser user. Furthermore, a portion or the whole configuration file can be considered as browser user information and provided for operations such as backing up at a server side, loading to the server side and/or synchronizing to the server side, so that the information in the configuration file is maintained consistent at different terminals used by the user, thus the user can maintain substantially the same use experience at different terminals.

Then, the method can proceed to step S707, a search request is initiated according to the search category selected by the user from the search category list information and the search engine selected from the search engine list information through the first sub-window 115. The search request can be initiated by the search request generator 107 of the browser 100 as shown in FIG. 1, and its form cab be a get request of a http generated according to the search key word and a web address URL corresponding to the selected search category and search engine. In an embodiment, the search key word used in the search request can employ the same search key word as an external search request. In other embodiments, the search key word used in the search request can be the search key word input by the user through the input box control of the browser, or the search key word used by the user in last search, or the search key word selected by the user from a list of history record of search key words.

Then, the method can proceed to step S709. A corresponding search result returned from the search engine selected from the search engine list information according to the search request is loaded in the second sub-window 117. The search result loader 109 of the browser 100 shown in FIG. 1 can load the search result corresponding to the search request in the second sub-window 117.

Subsequently, the method may return to step S707 again according to needs to initiate another search request. In the case that there is only one second sub-window 117 as shown in FIG. 2-FIG. 5, the search result of the current search request can be updated and loaded in the second sub-window 117 in step S709. In another embodiment, as shown in FIG. 6, there may be plural second sub-windows 117 respectively for loading search results of corresponding plural search requests, wherein the plural search requests can be initiated according to the same search key word but according to different search categories and/or different search engines. As such, when step S707 is executed each time, one more second sub-window 117 can be generated in step S709 to load the search result of the current search request, and meanwhile previous search results are retained in other second sub-windows 117 of the browser webpage so that it is convenient for the user to simultaneously look up or compare search results of multiple search requests.

The algorithm and display provided herein are not intrinsically related to any specific computer, virtual system or other devices. Various general systems may also be used together with a teaching based on this. According to the above depictions, structures required for constructing such type of systems are obvious. Besides, the present application is not with respect to any specific programming language. It shall be understood that various programming languages may be used to implement the content of the present invention described here, and the above depictions for specific language are intended to reveal preferred embodiments of the present invention.

Regarding an apparatus embodiment, since it is substantially similar to the method embodiment, it is described relatively simply and reference may be made to partial depictions of the method embodiment for relevant portions.

Embodiments of the present description all are described in a progressive manner, each embodiment focuses on differences from other embodiments, and reference may be made between embodiments for identical or similar portions.

Embodiments regarding parts in the present invention may be implemented in hardware, or implemented by software modules running on one or more processors, or implemented in their combinations. Those skilled in the art should understand that a microprocessor or digital signal processor (DSP) may be used in practice to implement some or all functions of some or all parts of the user terminal device for performing webpage search according to embodiments of the present invention. The present invention may also be implemented as an apparatus or device program (e.g., computer program and computer program product) for executing part or all of the method described here. Such programs implementing the present invention may be stored in a computer-readable medium, or may be in a form having one or more signals. Such signals can be obtained by downloading from the Internet, or provided on a carrier signal or provided in any other forms.

Figure 8:
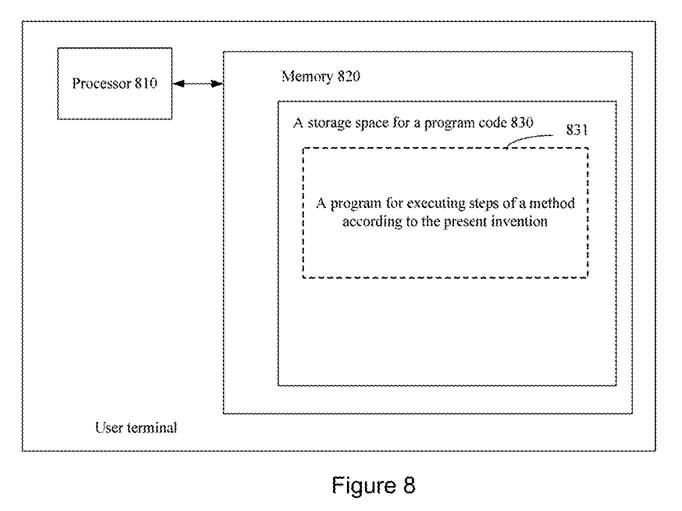
FIG. 8 schematically illustrates a block diagram of a user terminal for performing the method according to the present invention.
Figure 9:
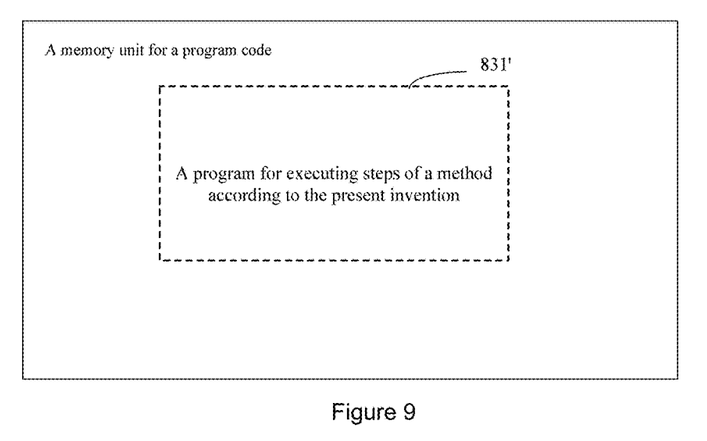
FIG. 9 schematically illustrates a memory unit for retaining or carrying program codes for performing the method according to the present invention.

For example, FIG. 8 illustrates a user terminal for performing the webpage searching method according to the present invention. The user terminal conventionally comprises a processor 810 and a computer program product or computer-readable medium in the form of a memory 820. The memory 820 may be a flash memory, EEPROM (Electrically Erasable Programmable Read-Only Memory), EPROM, hard disk or ROM-like electronic memory. The memory 820 has a storage space 830 for a program code 831 for executing any step of the above method. For example, the storage space 830 for the program code may comprise program codes 831 respectively for implementing steps of the above method. These program codes may be read from one or more computer program products or written into the one or more computer program products. These computer program products comprise program code carriers such as hard disk, compact disk (CD), memory card or floppy disk. Such computer program products are usually portable or fixed memory units as shown in FIG. 9. The memory unit may have a storage section, a storage space or the like arranged in a similar way to the memory 820 in the user terminal of FIG. 8. The program code may for example be compressed in a suitable form. Usually, the memory unit includes a computer-readable code 831', namely, a code readable by a processor such as 810. When these codes are run by the user terminal, the user terminal is caused to execute steps of the method described above.

Reference herein to "one embodiment", "an embodiment", or to "one or more embodiments" means that a particular feature, structure, or characteristic described in connection with the embodiments is included in at least one embodiment of the invention. Further, it is noted that instances of the phrase "in one embodiment" herein does not certainly completely refer to the same embodiment.

The description as provided here describes a lot of specific details. However, it is appreciated that embodiments of the present invention may be implemented in the absence of these specific details. Some embodiments do not specify detail known methods, structures and technologies to make the description apparent.

It should be noted that the above embodiment illustrate the present invention but are not intended to limit the present invention, and those skilled in the art may design alternative embodiments without departing from the scope of the appended claims. In claims, any reference signs placed in parentheses should not be construed as limiting the claims. The word "comprising" does not exclude the presence of elements or steps not listed in a claim. The word "a" or "an" preceding an element does not exclude the presence of a plurality of such elements. The present invention may be implemented by virtue of hardware including several different elements and by virtue of a properly-programmed computer. In the apparatus claims enumerating several units, several of these units can be embodied by one and the same item of hardware. The usage of the words first, second and third, et cetera, does not indicate any ordering. These words are to be interpreted as names.

In addition, it should be noted that the language used in the specification has been principally selected for readability and instructional purposes, and may not have been selected to delineate or circumscribe the inventive subject matter. Therefore, those having ordinary skill in the art appreciate that many modifications and variations without departing from the scope and spirit of the appended claims are obvious. The disclosure of the present invention is intended to be illustrative, but not limiting, of the scope of the invention, which is set forth in the claims.

The invention claimed is:

1. A computing device having a browser for performing a webpage search, the computing device comprising:
    a memory having computer executable instructions stored thereon; and
    a processor to execute the instructions to perform operations comprising:
    generating at least one first sub-window and at least one second sub-window in a browser webpage window of the browser;
    loading content in the at least one first sub-window of the browser webpage window, wherein the loaded content of the at least one first sub-window includes search category list information and search engine list information corresponding to search categories in the search category list information, to enable a user to select a search category and a search engine, wherein the search category list information and the search engine list information are loaded respectively in two first sub-windows of the at least one of first sub-window;
    initiating at least two search requests to different search engines selected from the search engine list information corresponding to different search categories selected and a same search key word input at the browser; and
    loading in the at least two second sub-windows of the browser webpage window search results returned by the search engines selected from the search engine list information according to the search requests,
    wherein a plurality of search results of corresponding search requests are loaded respectively in the at least two second sub-windows simultaneously in the same browser webpage window, and the two search requests are initiated for the same search key word using different search categories and different search engines.

2. The computing device according to claim 1, wherein the first sub-window is divided from a side portion of the browser webpage window.

3. The computing device according to claim 1, wherein the search key word comprises:
    a search key word input by the user through an input box control of the browser, or
    a search key word used by the user in a last search, or
    a search key word selected by the user from a list of a history record of search key words.

4. The computing device according to claim 1, wherein the loaded content of the first sub-window further comprises an input box control for the user to input the search key word.

5. The computing device according to claim 1, wherein the browser further comprises a configuration file for reflecting mapping relationships between a plurality of search categories and a plurality of search engines;
    the first sub-window loader loads the search category list information and the search engine list information according to the configuration file;
    wherein the configuration file is updated and modified according to a user modification instruction.

6. The computing device according to claim 5, wherein according to the search category selected from the search category list information and according to the configuration file, dynamically loading the search engine list information corresponding to the selected search category; or
    according to the search engine selected from the search engine list information and according to the configuration file, dynamically loading the search category list information corresponding to the selected search engine.

7. The computing device according to claim 5, wherein the configuration file further comprises preferred search engine information and/or preferred search category information set by the browser or browser user;
    wherein at least a portion of the configuration file is considered as browser user information for operations of backing up at a server, loading to the server or synchronizing to the server.

8. The computing device according to claim 1, wherein the search request comprises an HTTP get request generated according to the input search key word and a web address URL corresponding to the selected search category and search engine.

9. A webpage searching method for a browser, comprising:
    loading, by at least one processor, in at least one first sub-window of a browser webpage window search category list information and search engine list information corresponding to search categories in the search category list information, wherein two first sub-windows of the at least one first sub-window load the search category list information and the search engine list information respectively;
    according to a search category selected from the search category list information and a search key word input at the browser, initiating, by at least one processor, a search request to a search engine selected from the search engine list information corresponding to the search category; and
    loading, by at least one processor, in at least one second sub-window of the browser webpage window a corresponding search result returned by the search engine selected from the search engine list information according to the search request,
    wherein the at least one second sub-window is respectively used to load a plurality of search results of corresponding search requests, and the search requests are initiated for the same search key word using different search categories and/or different search engines,
    initiating at least two search requests to different search engines selected from the search engine list information corresponding to different search categories selected and a same search key word input at the browser: and
    loading in the at least two second sub-windows of the browser webpage window search results returned by the search engines selected from the search engine list information according to the search requests,
    wherein a plurality of search results of corresponding search requests are loaded respectively in the at least two second sub-windows simultaneously in the same browser webpage window, and the two search requests are initiated for the same search key word using different search categories and different search engines.

10. The method according to claim 9, wherein the first sub-window is a window divided from the browser webpage window and located at a side portion of the browser webpage window.

11. The method according to claim 9, wherein the search key word comprises:
    a search key word input by the user through an input box control of the browser, or
    a search key word used by the user in a last search, or
    a search key word selected by the user from a list of a history record of search key words.

12. The method according to claim 9, wherein the first sub-window further loads an input box control for the user to input the search key word.

13. The method according to claim 9, wherein the browser is provided with a configuration file for reflecting mapping relationships between a plurality of search categories and a plurality of search engines, and the search category list information and the search engine list information is loaded according to the configuration file,
  wherein the configuration file is updated by the browser or configured by the browser user.

14. The method according to claim 13, wherein, according to a search category selected from the search category list information and according to the configuration file, the search engine list information corresponding to the selected search category is dynamically loaded; or
  according to a search engine selected from the search engine list information and according to the configuration file, the search category list information corresponding to the selected search engine is dynamically loaded.

15. The method according to claim 13, wherein the configuration file further comprises preferred search engine information and/or preferred search category information set by the browser or browser user,
  wherein at least a portion of the configuration file is considered as browser user information for operations of backing up at a server, loading to the server or synchronizing to the server.

16. A non-transitory computer readable medium having instructions stored thereon that, when executed by at least one processor, cause the at least one processor to perform operations for a browser for performing a webpage search, the operations comprising:
  loading in at least one first sub-window of a browser webpage window search category list information and search engine list information corresponding to search categories in the search category list information, wherein two first sub-windows of the at least one first sub-window load the search category list information and the search engine list information respectively;
  according to a search category selected from the search category list information and a search key word input at the browser, initiating at least two search requests to different search engines selected from the search engine list information corresponding to the different search categories; and
  loading in at least two second sub-windows of the browser webpage window a corresponding search results returned by the search engines selected from the search engine list information according to the search requests,
  wherein the at least two second sub-windows are respectively used to load a plurality of search results of corresponding search requests, and the search requests are initiated for the same search key word using different search categories and different search engines.

\* \* \* \* \*